(12) United States Patent
Linsmeier

(10) Patent No.: US 12,715,376 B2
(45) Date of Patent: Aug. 25, 2026

(54) LIGHT SYSTEM FOR RESPONSE VEHICLE

(71) Applicant: Oshkosh Corporation, Oshkosh, WI (US)

(72) Inventor: Eric Linsmeier, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 174 days.

(21) Appl. No.: 18/632,699

(22) Filed: Apr. 11, 2024

(65) Prior Publication Data

US 2024/0343215 A1 Oct. 17, 2024

Related U.S. Application Data

(60) Provisional application No. 63/461,098, filed on Apr. 21, 2023, provisional application No. 63/458,708, filed on Apr. 12, 2023.

(51) Int. Cl.
*B60R 16/023* (2006.01)
*B60Q 1/50* (2006.01)

(52) U.S. Cl.
CPC ............ *B60R 16/0231* (2013.01); *B60Q 1/50* (2013.01)

(58) Field of Classification Search
CPC ...... B60R 16/0231; B60Q 1/50; B60Q 1/2611
USPC ........................................ 362/492, 493, 542
See application file for complete search history.

(56) References Cited

U.S. PATENT DOCUMENTS

2005/0036327 A1* 2/2005 Patel ........................ B60Q 1/50 362/487
2012/0201041 A1* 8/2012 Gergets ................ F21S 43/195 362/544
2020/0215962 A1* 7/2020 Brower ............... H04L 12/4625
2020/0406812 A1* 12/2020 Molines ............... B60Q 1/0088

* cited by examiner

*Primary Examiner* — Thomas M Sember
(74) *Attorney, Agent, or Firm* — Foley & Lardner LLP

(57) ABSTRACT

A fire apparatus includes a chassis, a cab coupled to the chassis, a body coupled to the chassis, a light system, and a vehicle controller. The light system includes a lightbar and a plurality of lights. The lightbar is coupled to the cab. The lightbar includes a plurality of lightbar lights and a lightbar controller. The plurality of lights are positioned about at least one of the cab or the body. The plurality of lights are directly coupled to the lightbar controller via a local interconnect network. The vehicle controller is directly coupled to the lightbar controller via a controller area network.

20 Claims, 4 Drawing Sheets

LIGHT SYSTEM FOR RESPONSE VEHICLE

CROSS-REFERENCE TO RELATED PATENT APPLICATIONS

This application claims the benefit of and priority to (a) U.S. Provisional Patent Application No. 63/458,708, filed Apr. 12, 2023, and (b) U.S. Provisional Patent Application No. 63/461,098, filed Apr. 21, 2023, both of which are incorporated herein by reference in their entireties.

BACKGROUND

A response vehicle may include a light system. The light system may include a lightbar and/or warning lights variously positioned about the response vehicle. Such light system may be used to warn others of the presence of the response vehicle, to move over, to avoid the area proximate the response vehicle, etc.

SUMMARY

One embodiment relates to a fire apparatus. The fire apparatus includes a chassis, a cab coupled to the chassis, a body coupled to the chassis, a light system, and a vehicle controller. The light system includes a lightbar and a plurality of lights. The lightbar is coupled to the cab. The lightbar includes a plurality of lightbar lights and a lightbar controller. The plurality of lights are positioned about at least one of the cab or the body. The plurality of lights are directly coupled to the lightbar controller via a local interconnect network. The vehicle controller is directly coupled to the lightbar controller via a controller area network.

Another embodiment relates to a light system for a response vehicle. The light system includes a lightbar and a plurality of lights. The lightbar is configured to couple to a portion of the response vehicle. The lightbar includes a lightbar controller configured to couple to a vehicle controller of the response vehicle via a controller area network. The plurality of lights are configured to be positioned about the response vehicle. The plurality of lights are configured to couple to the lightbar controller via a local interconnect network. The lightbar controller is configured to control operation of the lightbar and the plurality of lights.

Another embodiment relates to a response vehicle. The response vehicle includes a chassis, a cab coupled to the chassis, a body coupled to the chassis, a vehicle controller, and a light system. The light system includes a lightbar coupled to the cab and a plurality of lights positioned about at least one of the cab or the body. The lightbar is communicably coupled to the vehicle controller. The lightbar includes a housing with lightbar lights and a lightbar controller disposed therein. The plurality of lights are communicably coupled to the lightbar controller. The vehicle controller is configured to transmit a control signal to the lightbar controller. The lightbar controller is configured to control the lightbar lights and the plurality of lights based on the control signal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
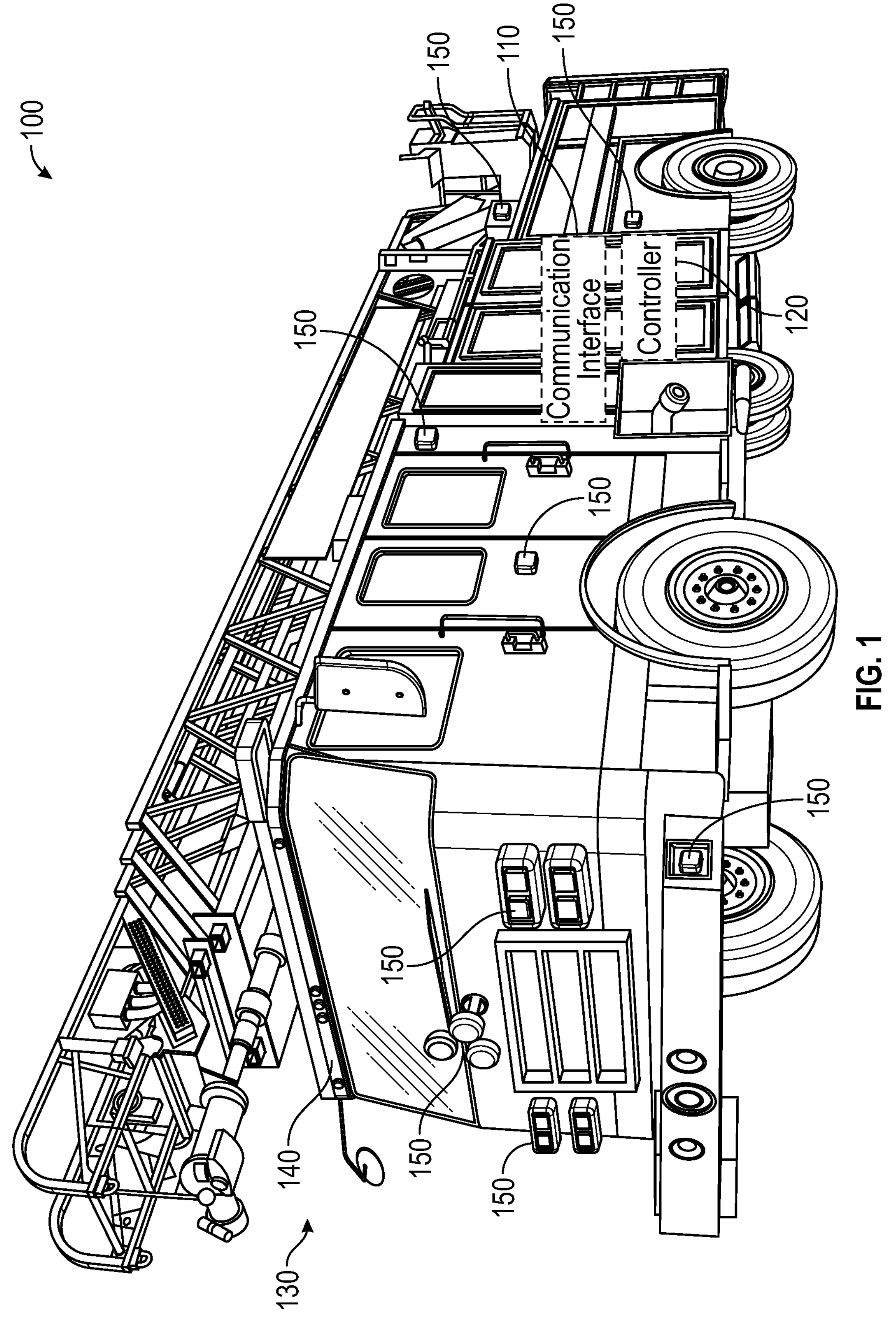
FIG. 1 is a front perspective view of a vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, the present disclosure relates to a smart light system for a response vehicle. The smart light system includes a lightbar having an associated and/or integrated/embedded lightbar controller and a plurality of auxiliary warning lights having an associated microprocessor (e.g., embedded therein). The lightbar controller (i) communicates directly with a vehicle controller of the response vehicle, and (ii) communicates directly with the microprocessors of the plurality of auxiliary warning devices. The smart light system of the present disclosure provides various advantages over traditional light systems including that the smart light system accommodates over-the-air updates, reduces the amount of hardware, harnesses, and programming, improves troubleshooting and diagnostics, facilitates active load management, and provides a futureproof design.

As shown in FIGS. 1-4, a vehicle, shown as response vehicle 100, includes a communication interface 110, a first or vehicle controller, shown as controller 120, and a first smart warning light system, subsystem, or subassembly, shown as first light system 130, including a first lighting element, shown as lightbar 140, and one or more first auxiliary lighting devices, shown as warning lights 150. According to an exemplary embodiment, the response vehicle 100 is an aerial ladder fire fighting vehicle that is periodically deployed to an emergency scene, such as the scene of a motor-vehicle accident, a house fire, or some other scene. In other embodiments, the response vehicle 100 is another type of emergency or response vehicle such as a "pumper" fire fighting vehicle, an ambulance, a law enforcement vehicle, a security vehicle, an Aircraft Rescue and Fire Fighting (ARFF) vehicle, a tow truck, or some other vehicle that responds to scenes (e.g., accidents, fires, criminal activity, etc.). In some embodiments, the response vehicle 100 is not an emergency vehicle, but rather the response vehicle 100 is any type of vehicle that has exterior lights onboard (e.g., a dump truck, a construction vehicle, etc.).

The communication interface 110 may be configured to facilitate wired or wireless communication between (i) the controller 120 and (ii) the first light system 130 and/or other components/systems of the response vehicle 100. The communication interface 110 may include programming and/or hardware-based components that connect the controller 120 of the response vehicle 100 to the first light system 130 over a wired or wireless network. For example, the communication interface 110 may include a wireless transceiver (e.g., Bluetooth® transceiver, cellular modem, a Wi-Fi® transceiver) and/or a wired connection. In some arrangements, the communication interface 110 includes hardware and machine-readable media structured to support communication over multiple channels of data communication (e.g., wireless, Bluetooth®, near-field communication, etc.). In yet other arrangements, the communication interface 110 may include one or more cryptography modules to establish a secure communication session (e.g., using the IPSec protocol or similar) in which data communicated over the session is encrypted and securely transmitted.

Figure 4:
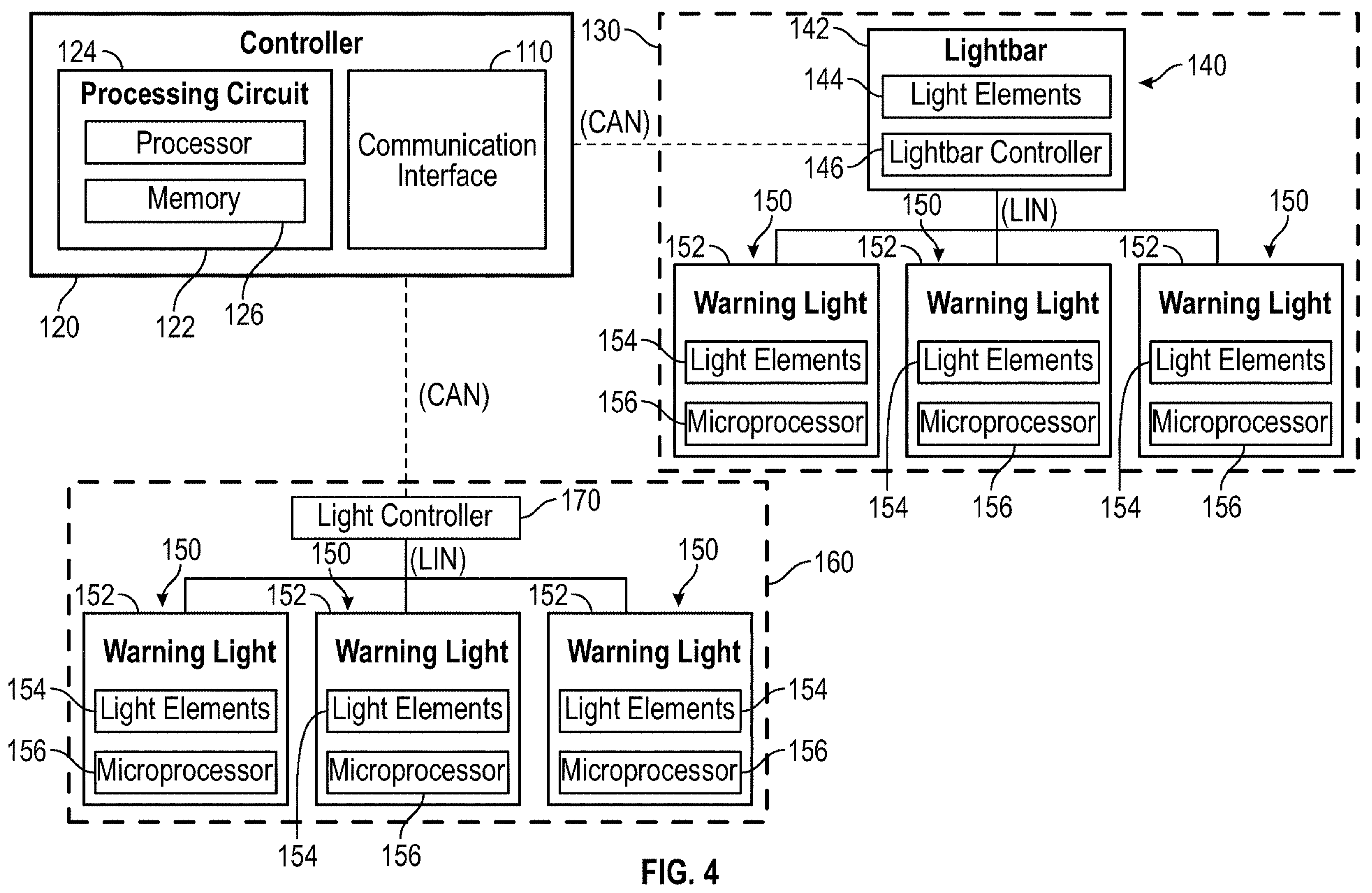
FIG. 4 is a block diagram of the light system of FIG. 3, according to an exemplary embodiment.

According to an exemplary embodiment, the controller 120 is communicably coupled to the communication interface 110. In some embodiments, the controller 120 and the communication interface 110 are integrated into a single component or device. As shown in FIG. 4, the controller 120 includes a processing circuit 122. The processing circuit 122 includes one or more processors 124 and a memory 126. The processor 124 may be a general or specific purpose processor, an application specific integrated circuit (ASIC), one or more field programmable gate arrays (FPGAs), a group of processing components, or other suitable processing components. According to an exemplary embodiment, the one or more processors 124 may be coupled to the memory 126 and may be configured to execute computer code or instructions stored in the memory 126 or received from other computer-readable media (e.g., USB drive, network storage, remote server, etc.). The memory 126 may include one or more memory devices (e.g., memory units, storage devices, etc.) for storing data and/or computer code for completing and/or facilitating the various processes described herein. The memory may include random access memory (RAM), read-only memory (ROM), hard drive storage, temporary storage, non-volatile memory, flash memory, optical memory, or any other suitable memory for storing software objects and/or computer instructions. The memory 126 may include database components, object code components, script components, or any other type of information structure for supporting the various activities described herein in connection with the systems, apparatuses, and methods for communicating with and/or controlling the first light system 130. The memory 126 may be communicably coupled to the processor 124 and may include computer code that, when executed by the one or more processors, performs one or more of the processes described herein.

The controller 120 may be configured to transmit commands, data, or information (e.g., a command signal) to the first light system 130 via the communication interface 110, as described herein. Likewise, the controller 120 may be configured to receive commands, data, or information from the first light system 130 via the communication interface 110. In some embodiments, the commands, data, or information transmitted from or received by the controller 120 is related to control, configuration, settings, troubleshooting, diagnostics, etc. of the first light system 130.

The controller 120 may be communicably coupled to one or more other vehicle systems, such as hydraulic systems, electrical systems, electromechanical systems, or otherwise. For example, the controller 120 may be communicably coupled to an engine, a pumping system, a ladder system, an outrigger system, and/or another system of the response vehicle 100. In various embodiments, the controller 120 may be configured to transmit commands, data, or information to the various systems of the response vehicle 100 in order to control (i.e., permit, prevent, modify) various functions of the response vehicle 100.

According to an exemplary embodiment, the first light system 130 (e.g., the lightbar 140, the warning lights 150, etc.) is configured to emit lights in various patterns, with various colors, at various frequencies, and/or with varying intensities or brightness. For example, the first light system 130 may emit pulsing lights, strobing lights, constant lights (e.g., spotlight), colored lights, etc. The first light system 130 may provide flashing lights or controlled to flash such that, when flashing, indicate that the response vehicle 100 is deployed for emergency purposes (e.g., to respond to a fire, a motor vehicle accident, etc.). In some embodiments, one or more components of the first light system 130 emit a constant, bright light to illuminate a scene so operators, emergency personnel, etc. may be able to see an otherwise dark emergency scene, for example.

Figure 2:
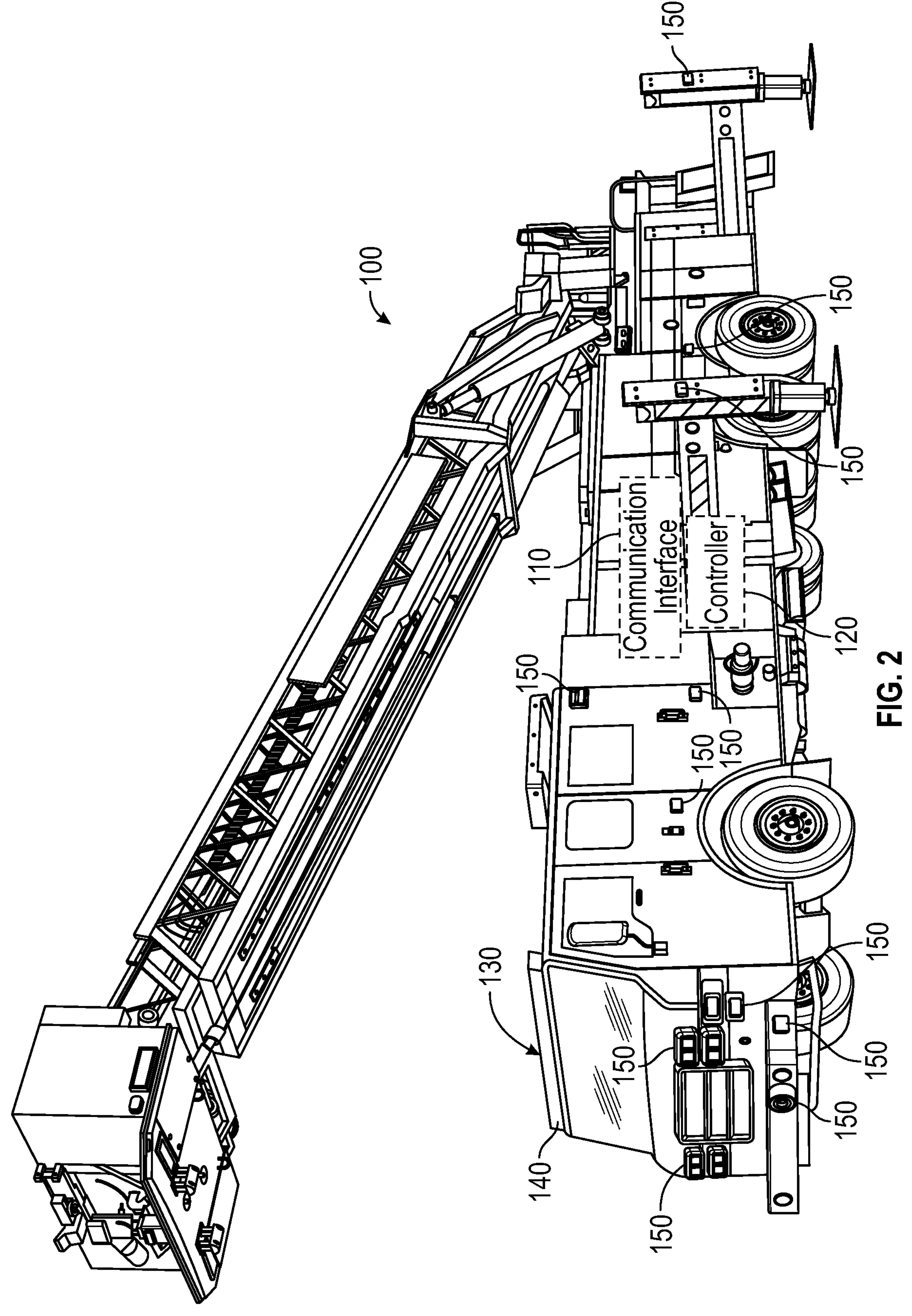
FIG. 2 is another front perspective view of the vehicle of FIG. 1, according to an exemplary embodiment.
Figure 3:
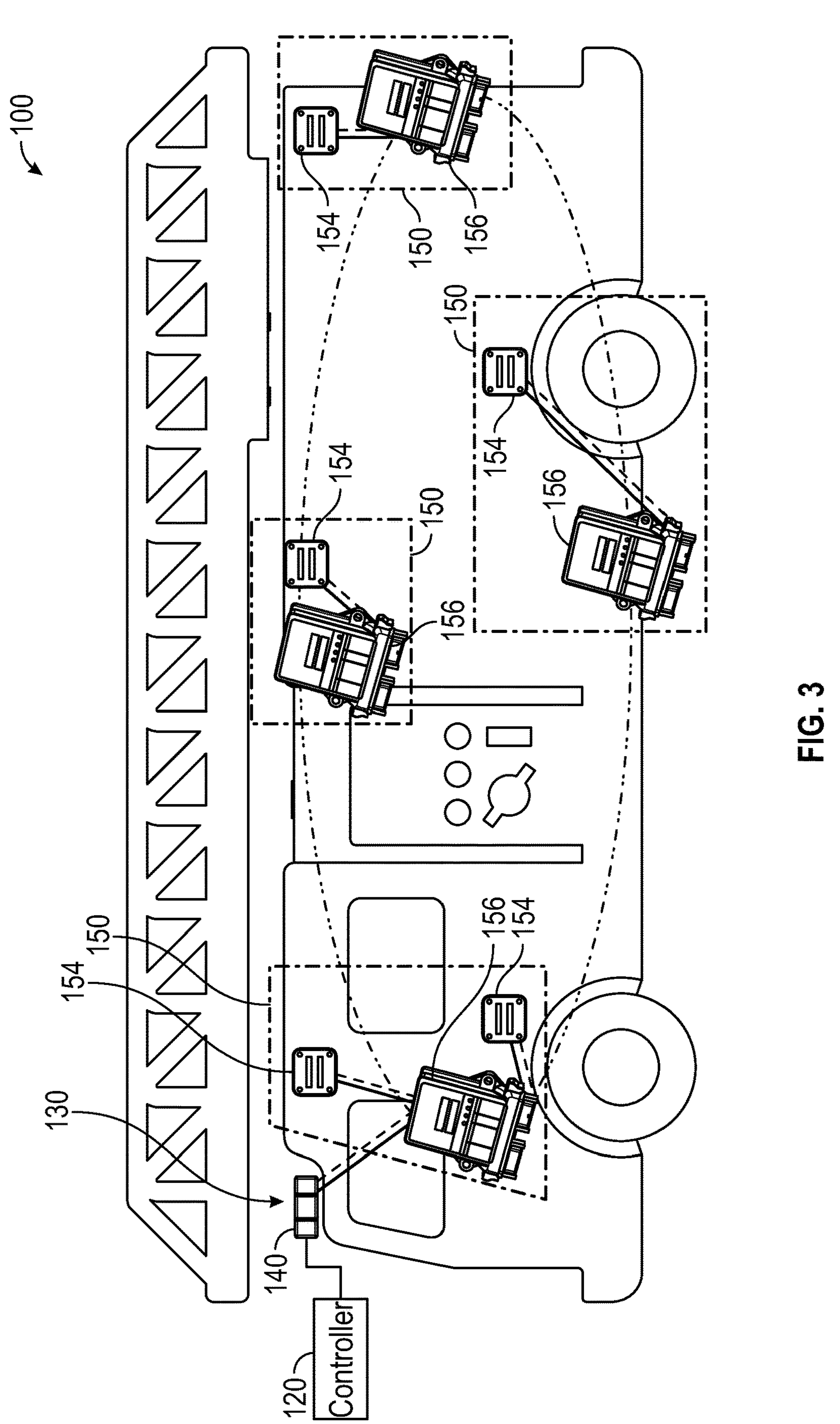
FIG. 3 is a schematic diagram of a light system of the vehicle of FIG. 1, according to an exemplary embodiment.

As shown in FIGS. 1-3, the lightbar 140 is coupled, mounted, or otherwise affixed to the response vehicle 100 on a top surface of a cab of the response vehicle 100. In some embodiments, the lightbar 140 is otherwise mounted or otherwise affixed to the response vehicle 100 at or on other surfaces or components thereof. As shown in FIG. 4, the lightbar 140 includes a housing, shown as lightbar housing 142, a plurality of light elements, shown as light elements 144, disposed within the lightbar housing 142, and a second controller, shown as lightbar controller 146, disposed within the lightbar housing 142. As shown in FIGS. 3 and 4, the lightbar controller 146 is directly communicably coupled to the controller 120. In some embodiments, the lightbar controller 146 is communicably coupled to the controller 120 through a controller area network ("CAN") (e.g., via the communication interface 110).

The lightbar controller 146 may include a processing circuit. The processing circuit may include one or more processors and a memory. The processor may be a general or specific purpose processor, an application specific integrated circuit (ASIC), one or more field programmable gate arrays (FPGAs), a group of processing components, or other suitable processing components. According to an exemplary embodiment, the one or more processors may be coupled to the memory and may be configured to execute computer code or instructions stored in the memory or received from other computer-readable media (e.g., USB drive, network storage, remote server, etc.). The memory may include one or more memory devices (e.g., memory units, storage devices, etc.) for storing data and/or computer code for completing and/or facilitating the various processes described herein. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities described herein in connection with the systems, apparatuses, and methods for coordinating vehicle lights. The memory may be communicably coupled to the processor and may include computer code that, when executed by the one or more processors, performs one or more of the processes described herein.

As shown in FIGS. 1-3, the warning lights 150 are coupled, mounted, or otherwise affixed to the response vehicle 100 at or on a plurality of vehicle surfaces (e.g., front, top, sides, back, the cab, the rear body, outriggers, ladder assembly, bumper, etc.) of the response vehicle 100 such that the light emitted from the warning lights 150 may be seen from various viewpoints around the response vehicle 100. As shown in FIGS. 3 and 4, each of the warning lights 150 includes a housing, shown as light housing 152, one or more light elements, shown as light elements 154, disposed within the light housing 152, and a third controller, microcontroller, or processing circuit, shown as microprocessor 156. In some embodiments, as shown in FIG. 4, the microprocessor 156 is disposed within the light housing 152. In some embodiments, as shown in FIG. 3, the microprocessor 156 is separate from the light housing 152 and the light elements 154. In some embodiments, one or more of the microprocessors 156 can each be associated with multiple of the warning lights 150.

As shown in FIGS. 3 and 4, the microprocessors 156 of the warning lights 150 are directly communicably coupled with lightbar controller 146 of the lightbar 140. The lightbar 140 may include programming and/or hardware-based components that connect the lightbar controller 146 to the microprocessors 156 of the warning lights 150. For example, the lightbar 140 may include a wireless transceiver (e.g., Bluetooth® transceiver, cellular modem, a Wi-Fi® transceiver) and/or a wired connection. The microprocessors 156 may be connected to the lightbar controller 146 through a first local interconnect network ("LIN"). In some arrangements, the lightbar 140 includes hardware and machine-readable media structured to support communication over multiple channels of data communication (e.g., wireless, Bluetooth®, near-field communication, etc.). In yet other arrangements, the lightbar 140 may include one or more cryptography modules to establish a secure communication session (e.g., using the IPSec protocol or similar) in which data communicated over the session is encrypted and securely transmitted.

The lightbar controller 146 transmits commands, data, or information to the warning lights 150. The commands, data, or information may be re-transmitted by the lightbar controller 146 based on communications from the controller 120 via the communication interface 110, or the lightbar controller 146 may generate new commands, data, or information based on commands, data, or information received from the controller 120. The microprocessors 156 of the warning lights 150 are configured to execute the commands, data, or information received from the lightbar controller 146. By way of example, the microprocessors 156 may control the warning lights 150 to emit light according to a pattern, color, intensity, etc. commanded by the lightbar controller 146, adjust settings or configurations thereof, perform load management, perform trouble shooting and diagnostics, apply software updates, etc.

According to an exemplary embodiment, the arrangement of the controller 120 and the first light system 130 of the present disclosure provides various advantages relative to prior vehicle warning light systems. Traditionally, vehicle warning light systems (i) operate as a network of fully independent on/off lights and/or (ii) require an independent light controller, operator interface, hardware, harnessing, and programming to facilitate the operation and control thereof. The first light system 130 disclosed herein facilitates integrating the lightbar 140 into the ecosystem of the response vehicle 100 (e.g., through the CAN of the response vehicle 100) and, therefore, permits full control of the first light system 130 using the controller 120 of the response vehicle 100 and associated user interface (e.g., in-cab display). The lightbar 140 can then communicate with the warning lights 150 (e.g., through the first LIN) for configuration, control, troubleshooting and diagnostics, software updates, etc. Accordingly, there is no need for additional controllers, modules, interfaces, etc. required by traditional lighting system designs and, therefore, eliminates the need for additional hardware, harnessing, and programming required by traditional systems. Instead, the controller 120 directly communicates with the first light system 130. Further, such an arrangement of the controller 120 and the first light system 130 facilitates active load management to auto-adjust electrical outputs based on managed vehicle priorities, and the controller 120 can recognize and compensate for voltage fluctuations (which can greatly reduce light flickering). Further, such a fully integrated lighting system facilitates constant communication with the controller 120, which can reduce time spent on diagnostics and repair. In addition, the controller 120 is configured facilitate over-the-air updates for software of the first light system 130 (e.g., update the software of the first light system 130 without re-engineering the fire apparatus). Further, in an example where the first light system 130 is wired to the controller 120, the first light system 130 facilitates standard wiring integration with an electrical system of the response vehicle 100. Further, such a design standardizes the first light system 130, which reduces engineering time needed to design and manufacture for subsequent vehicle designs (e.g., a futureproof design).

In some embodiments, the response vehicle 100 includes more than one smart warning light system, subsystem, or subassembly. As shown in FIG. 4, the response vehicle 100 includes a second smart warning light system, subsystem, or subassembly, shown as second light system 160. The second light system 160 includes a light controller 170 and one or more second auxiliary lighting devices, shown as warning lights 150. The second light system 160 or components thereof may be the same or similar to the first light system 130 or the components thereof as described in greater detail above. As shown in FIG. 4, the light controller 170 is directly communicably coupled to the controller 120 through the CAN. The light controller 170 may be similar to the lightbar controller 146 as described in greater detail above. In some embodiments, the light controller 170 includes programming and/or hardware-based components connected to the microprocessors 156 of one or more of the warning lights 150 of the second light system 160 through a second LIN. In some embodiments, the light controller 170 is or replaces the microprocessor 156 of one of the warning lights 150 of the second light system 160. In some embodiments, the first light system 130 is associated with a first portion of the response vehicle 100 (e.g., the cab) and the second light system 160 is associated with a second, different portion of the response vehicle 100 (e.g., the rear section, the body, etc.). In some embodiments, the first light system 130 has a first function or a first type of lights (e.g., response lights, hazard lights, warning lights, for use when responding or driving to scene or incident, etc.) and the second light system 160 has a second function or a second type of lights (e.g., running lights, scene lights, non-warning lights, for when not responding to a scene, when on the scene but not driving, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system (e.g., light system, etc.) as shown in the various exemplary embodiments is illustrative only. Additionally, any element disclosed in one embodiment may be incorporated or utilized with any other embodiment disclosed herein.

The invention claimed is:

1. A fire apparatus comprising:

a chassis;

a cab coupled to the chassis;

a body coupled to the chassis;

a local interconnect network;

a controller area network separate from the local area network;

a light system including:

a lightbar coupled to the cab, the lightbar including a plurality of lightbar lights and a lightbar controller; and a plurality of lights positioned about at least one of the cab or the body, the plurality of lights directly coupled to the lightbar controller via the local interconnect network; and a vehicle controller directly coupled to the lightbar controller via the controller area network.

2. The fire apparatus of claim 1, wherein the vehicle controller is configured to control operation of the light system.

3. The fire apparatus of claim 2, wherein the light system is a first light system and the plurality of lights are a first plurality of lights, further comprising a second light system including:

a light controller; and a second plurality of lights positioned about at least one of the cab or the body, the second plurality of lights directly coupled to the light controller via a second local interconnect network.

4. The fire apparatus of claim 3, wherein the light controller is directly coupled to the vehicle controller via the controller area network, and wherein the vehicle controller is configured to control operation of the second light system.

5. The fire apparatus of claim 3, wherein the first light system is associated with a first portion of the fire apparatus and the second light system is associated with a second portion of the fire apparatus different than the first portion of the fire apparatus.

6. The fire apparatus of claim 3, wherein the first light system is associated with a first function and the second light system is associated with a second function different than the first function.

7. The fire apparatus of claim 3, wherein the lightbar controller is configured to control operation of the plurality of lightbar lights of the lightbar and the first plurality of lights, and wherein the light controller is configured to control operation of the second plurality of lights.

8. The fire apparatus of claim 2, wherein each of the plurality of lights includes a light housing, a light element disposed within the light housing, and a microprocessor.

9. The fire apparatus of claim 8, wherein the microprocessor is communicably coupled with the lightbar controller via the local interconnect network.

10. The fire apparatus of claim 8, wherein the microprocessor is configured to control operation of the light element based on a control signal received from the lightbar controller.

11. The fire apparatus of claim 10, wherein the control signal received from the lightbar controller is transmitted by the lightbar controller based on communications from the vehicle controller.

12. The fire apparatus of claim 1, wherein the plurality of lightbar lights of the lightbar and the plurality of lights are configured to emit lights in one or more patterns, with one or more colors, at one or more frequencies, or with one or more intensities based on communication between the vehicle controller and the lightbar controller.

13. The fire apparatus of claim 12, wherein the lightbar controller is configured to control operation of the plurality of lightbar lights of the lightbar and the plurality of lights.

14. The fire apparatus of claim 1, wherein the lightbar includes a housing, and wherein the plurality of lightbar lights and the lightbar controller are disposed within the housing.

15. A light system for a response vehicle, the light system comprising:

a lightbar configured to couple to a portion of the response vehicle, the lightbar including a plurality of lightbar lights and a lightbar controller configured to couple to a vehicle controller of the response vehicle via a controller area network; and a plurality of lights configured to be positioned about the response vehicle, the plurality of lights configured to couple to the lightbar controller via a local interconnect network;

wherein the lightbar controller is configured to control operation of the plurality of lightbar lights and the plurality of lights.

16. The light system of claim 15, wherein each of the plurality of lights includes a light housing, a light element disposed within the light housing, and a microprocessor.

17. The light system of claim 16, wherein the microprocessor is communicably coupled with the lightbar controller via the local interconnect network.

18. The light system of claim 16, wherein the microprocessor is configured to control operation of the light element based on a control signal received from the lightbar controller.

19. The light system of claim 18, wherein the control signal received from the lightbar controller is transmitted by the lightbar controller based on communications from the vehicle controller.

20. A response vehicle comprising:

a chassis;

a cab coupled to the chassis;

a body coupled to the chassis;

a vehicle controller; and a light system including:

a lightbar coupled to the cab, the lightbar communicably coupled to the vehicle controller, the lightbar including a housing with lightbar lights and a lightbar controller disposed therein; and a plurality of lights positioned about at least one of the cab or the body, the plurality of lights communicably coupled to the lightbar controller;

wherein the vehicle controller is configured to transmit a control signal to the lightbar controller; and wherein the lightbar controller is configured to control the lightbar lights and the plurality of lights based on the control signal.

* * * * *